US012798953B2

(12) United States Patent
Apostolides

(10) Patent No.: US 12,798,953 B2
(45) **Date of Patent: *Nov. 17, 2026**

(54) ROBOTIC SERVICING SYSTEM

(71) Applicant: RPM INDUSTRIES, LLC, Washington, PA (US)

(72) Inventor: John K. Apostolides, Pittsburgh, PA (US)

(73) Assignee: RPM Industries, LLC, Washington, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/090,542

(22) Filed: Mar. 26, 2025

(65) Prior Publication Data

US 2025/0313450 A1 Oct. 9, 2025

Related U.S. Application Data

(63) Continuation of application No. 18/161,275, filed on Jan. 30, 2023, now Pat. No. 12,286,339, which is a continuation of application No. 16/941,970, filed on Jul. 29, 2020, now Pat. No. 11,608,261.

(60) Provisional application No. 62/880,007, filed on Jul. 29, 2019.

(51) Int. Cl.

| | |
|---|---|
| ***B67D 7/04*** | (2010.01) |
| ***B60S 5/00*** | (2006.01) |
| ***B67D 7/36*** | (2010.01) |

(52) U.S. Cl.

CPC .............. *B67D 7/0401* (2013.01); *B60S 5/00* (2013.01); *B67D 7/36* (2013.01); *B67D 2007/0417* (2013.01)

(58) Field of Classification Search

CPC ................... B67D 7/0401; B67D 7/36; B67D 2007/0417; B60S 5/00

USPC ............................................................. 141/9

See application file for complete search history.

(56) References Cited

U.S. PATENT DOCUMENTS

| | | | |
|---|---|---|---|
| 3,527,268 | A | 9/1970 | Ginsburgh |
| 4,708,175 | A | 11/1987 | Janashak et al. |
| 5,318,080 | A | 6/1994 | Viken |
| 5,415,247 | A | 5/1995 | Knorr |

(Continued)

FOREIGN PATENT DOCUMENTS

| | | | |
|---|---|---|---|
| CN | 109849860 | A | 6/2019 |
| DE | 19962969 | A1 | 7/2001 |
| DE | 102016221213 | A1 | 5/2018 |

OTHER PUBLICATIONS

International Search Report and Written Opinion of the International Searching Authority for International Application No. PCT/US2020/043991 mailed Dec. 22, 2020, 11 pages.

(Continued)

*Primary Examiner* — Christopher M Afful
(74) *Attorney, Agent, or Firm* — Metz Lewis Brodman Must O'Keefe

(57) ABSTRACT

A robotic servicing system. The robotic servicing system includes an evacuation system, a refill system and a robotic assembly. The evacuation system includes a first quick connect fitting configured to mate with a quick connect valve of a vehicle. The refill system includes a second quick connect fitting configure to mate with the quick connect valve of the vehicle. The robotic assembly is couplable to the evacuation system and the refill system, and is configured to autonomously connect the first and second quick connection fittings to the quick connect valve of the vehicle.

20 Claims, 11 Drawing Sheets

(56) References Cited

U.S. PATENT DOCUMENTS

| | | | |
|---|---|---|---|
| 5,462,679 | A | 10/1995 | Verdegan et al. |
| 5,554,278 | A | 9/1996 | Henderson |
| 5,626,170 | A | 5/1997 | Parker |
| 5,787,372 | A | 7/1998 | Edwards et al. |
| 6,463,967 | B1 | 10/2002 | Boyle |
| 6,595,228 | B1 | 7/2003 | Rome et al. |
| 6,709,530 | B1 | 3/2004 | Dietsch et al. |
| 7,841,357 | B2 | 11/2010 | Rankin |
| 8,393,362 | B1 | 3/2013 | Hollerback |
| 9,260,988 | B2 | 2/2016 | Lin |
| 10,095,239 | B1 | 10/2018 | Wood et al. |
| 10,207,411 | B2 | 2/2019 | Michalakis |
| 11,608,261 | B2 | 3/2023 | Apostolides |
| 12,286,339 | B2 | 4/2025 | Apostolides |
| 2003/0164200 | A1 | 9/2003 | Czeranna et al. |
| 2004/0211470 | A1 | 10/2004 | Apostolides |
| 2005/0279385 | A1 | 12/2005 | Grier et al. |
| 2012/0080563 | A1 | 4/2012 | Gryniewski et al. |
| 2017/0362076 | A1 | 12/2017 | Hall et al. |
| 2018/0112766 | A1 | 4/2018 | Bassis |
| 2019/0033880 | A1 | 1/2019 | Wood et al. |
| 2019/0282935 | A1 | 9/2019 | Apostolides |
| 2020/0079640 | A1 | 3/2020 | Lawler, III et al. |
| 2020/0108659 | A1 | 4/2020 | Downey et al. |
| 2020/0353900 | A1 | 11/2020 | Yusuf |

OTHER PUBLICATIONS

International Preliminary Report on Patentability for International Application No. PCT/US2020/043991 mailed Feb. 1, 2022, 9 pages.

Extended European Search Report for European Patent Application No. 20846967.6 dated Jul. 28, 2023.

ROBOTIC SERVICING SYSTEM

CROSS-REFERENCE TO RELATED APPLICATION

This application claims the benefit under 35 U.S.C. § 119(e) of the earlier filing date of U.S. Provisional Patent Application No. 62/880,007 filed on Jul. 29, 2019, titled ROBOTIC SERVICING SYSTEM, the contents of which are hereby incorporated by reference in their entirety.

BACKGROUND

Changing the motor oil in a motorized vehicle generally involves draining the "old" motor oil, replacing the "old" oil filter with a "new" oil filter, and adding "new" motor oil to the engine. For traditional oil changes, the drain plug located under the oil pan at the bottom of the engine is unscrewed and the force of gravity is relied on to have the "old" motor oil drain out of the vehicle. After the "old" oil has drained out of the vehicle, the drain plug is reinstalled, either with the existing drain plug gasket or with a new drain plug gasket. The "old" oil filter is then unscrewed and replaced with a "new" oil filter. With the drain plug reinstalled and the "new" oil filter installed, the "new" oil is added to the engine, typically through an opening positioned at the top side of the engine.

In order to perform the traditional oil change, certain human interaction, as well as certain tools and supplies, are generally required. For example, in some instances, a human may utilize a jack to raise the vehicle off of the ground to provide sufficient access to the underside of the vehicle. In other instances, the human may drive the vehicle up on ramps to provide sufficient access to the underside of the vehicle. In yet other instances, the human may position the vehicle on a lift which when actuated raises the vehicle off of the ground to provide sufficient access to the underside of the vehicle. The human typically utilizes a socket wrench to unscrew the drain plug, and relies on a container placed under the vehicle to catch the drained oil. Once the oil is drained from the vehicle, the human may thereafter add a new gasket to the drain plug and utilize the socket wrench to reinstall the drain plug.

The human may thereafter utilize a filter wrench or similar tool to remove the "old" oil filter and install a "new" oil filter. At this point, the vehicle is ready for the "new" oil to be added. However, prior to adding the new oil, the human generally opens the "hood" of the vehicle to gain access to the top side of the engine, unscrews the oil filler cap and places a funnel in the opening previously covered by the oil filler cap. The human may then open the "new oil" container and pour the new oil into the funnel, where the oil then flows into the engine of the vehicle. Once the desired amount of oil has been added, the human typically reinstalls the oil filler cap and closes the hood of the vehicle. In the above-described process, in addition to the amount of human interaction utilized to complete the oil change, the human also carries the burden of securing the correct size drain plug gasket, the correct size oil filter and the recommended "new" oil (e.g., synthetic or non-synthetic, viscosity, etc.). For a person or family with multiple vehicles, or a shop which services multiple vehicles, each of these can vary from vehicle to vehicle, thereby increasing the costs associated with the equipment and tools needed to perform the oil change.

Furthermore, despite due care being taken when performing the traditional oil change, it is not uncommon for at least some of the oil to wind up on the ground, on the clothes of the person performing the oil change or on the hands/skin of the person performing the oil change. Any spillage of oil onto the ground constitutes an unwanted environmental incident, and if the oil is relatively hot, as is often the case, the spillage onto the clothes or hands/skin can cause unwanted burns to the person performing the oil change.

BRIEF DESCRIPTION OF THE DRAWINGS

The novel features of the aspects described herein are set forth with particularity in the appended claims. The aspects, however, both as to organization and methods of operation may be better understood by reference to the following description, taken in conjunction with the accompanying drawings.

DETAILED DESCRIPTION

Figure 1:
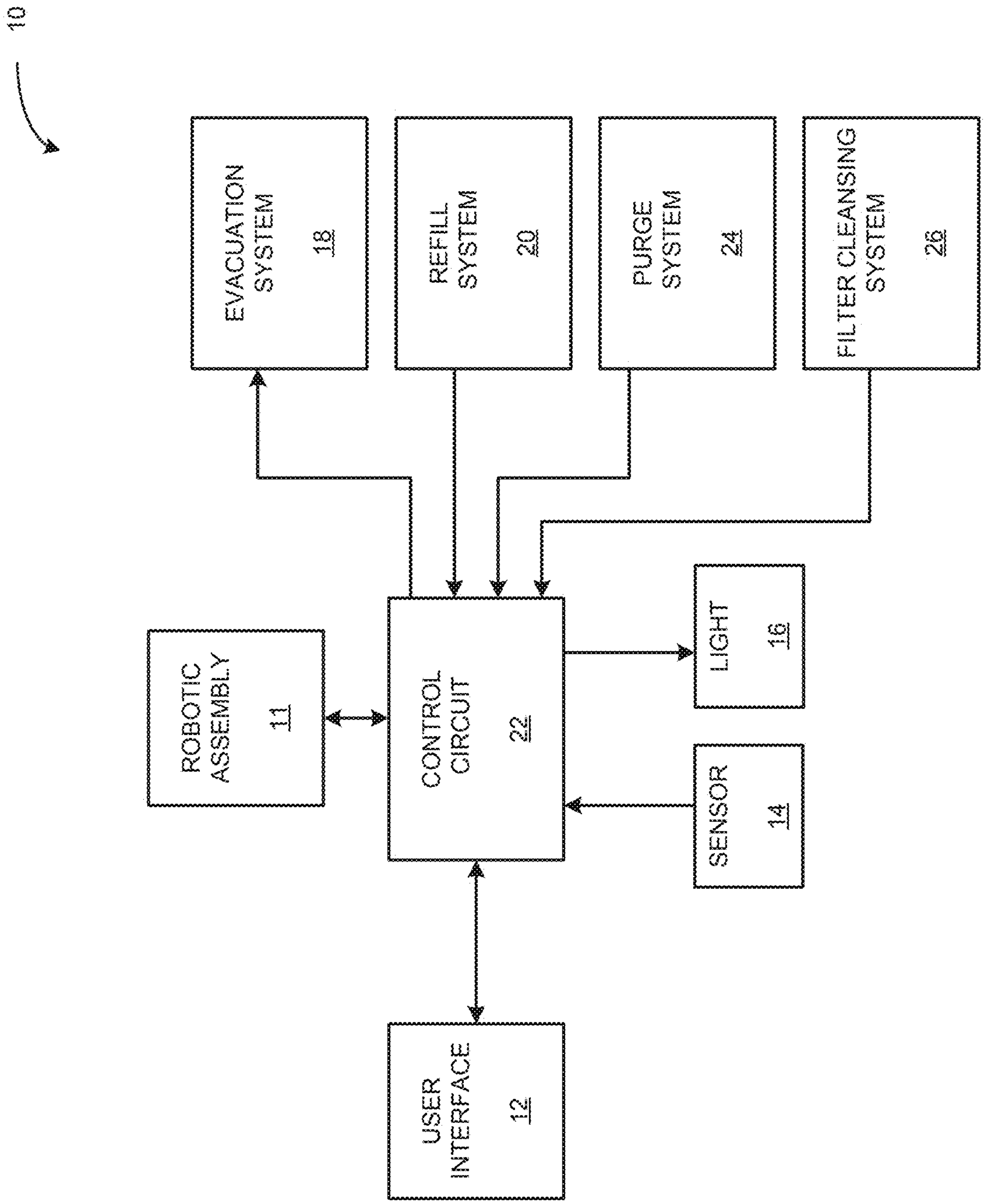
FIG. 1 illustrates a robotic servicing system, in accordance with at least one aspect of the present disclosure.

It is to be understood that at least some of the figures and descriptions of the invention have been simplified to illustrate elements that are relevant for a clear understanding of the invention, while eliminating, for purposes of clarity, other elements that those of ordinary skill in the art will appreciate may also comprise a portion of the invention. However, because such elements are well known in the art, and because they do not facilitate a better understanding of the invention, a description of such elements is not provided herein.

In the following detailed description, reference is made to the accompanying drawings, which form a part hereof. In the drawings, similar symbols and reference characters typically identify similar components throughout several views, unless context dictates otherwise. The illustrative aspects described in the detailed description, drawings and claims are not meant to be limiting. Other aspects may be utilized, and other changes may be made, without departing from the scope of the technology described herein.

The following description of certain examples of the technology should not be used to limit its scope. Other examples, features, aspects, embodiments and advantages of the technology will become apparent to those skilled in the art from the following description, which is by way of illustration, one of the best modes contemplated for carrying out the technology. As will be realized, the technology described herein is capable of other different and obvious aspects, all without departing from the technology. Accordingly, the drawings and descriptions should be regarded as illustrative in nature and not restrictive.

It is further understood that any one or more of the teachings, expressions, aspects, embodiments, examples, etc. described herein may be combined with any one or more of the other teachings, expressions, aspects, embodiments, examples, etc. that are described herein. The following described teachings, expressions, aspects, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

Before explaining the various aspects of the robotic servicing system in detail, it should be noted that the various aspects disclosed herein are not limited in their application or use to the details of construction and arrangement of parts illustrated in the accompanying drawings and description. Rather, the disclosed aspects may be positioned or incorporated in other aspects, embodiments, variations and modifications thereof, and may be practiced or carried out in various ways. Accordingly, aspects of the robotic servicing system disclosed herein are illustrative in nature and are not meant to limit the scope or application thereof. Furthermore, unless otherwise indicated, the terms and expressions employed herein have been chosen for the purpose of describing the aspects for the convenience of the reader and are not meant to limit the scope thereof. In addition, it should be understood that any one or more of the disclosed aspects, expressions of aspects, and/or examples thereof, can be combined with any one or more of the other disclosed aspects, expressions of aspects, and/or examples thereof, without limitation.

Also, in the following description, it is to be understood that terms such as inward, outward, upward, downward, above, below, left, right, interior, exterior and the like are words of convenience and are not to be construed as limiting terms. Terminology used herein is not meant to be limiting insofar as devices described herein, or portions thereof, may be attached or utilized in other orientations. The various aspects will be described in more detail with reference to the drawings.

FIG. 1 illustrates a robotic servicing system 10, in accordance with at least one aspect of the present disclosure. The robotic servicing system 10 includes a robotic assembly 11, a user interface 12, one or more sensors 14, one or more indicating lights 16, an evacuation system 18, a refill system 20 and a control circuit 22. According to various aspects, the robotic servicing system 10 may also include a purge system 24 and a filter cleansing system 26. For instances where the vehicle is equipped with a quick fit valve accessible from an exterior of the vehicle, a reusable oil filter (or a plurality of reusable oil filters) and a radio-frequency identification (RFID) tag or other means of identification, the robotic servicing system 10 can be a stand-alone, unmanned station which performs a robotically implemented engine oil change in remote locations or at designated service providers. The robotic servicing system 10 can also perform other various service operations on the vehicle such as, for example, refueling the vehicle, checking/altering tire pressure, checking brakes, greasing the vehicle and checking/adding various fluids (e.g., transmission fluid, wiper fluid, coolant, etc.) to the vehicle. For purposes of simplicity, the robotic servicing system 10 will be described hereinafter in the context of an oil change service. However, it will be appreciated that the robotic servicing system 10 may be utilized to perform any number of different service operations on the vehicle.

Figure 2:
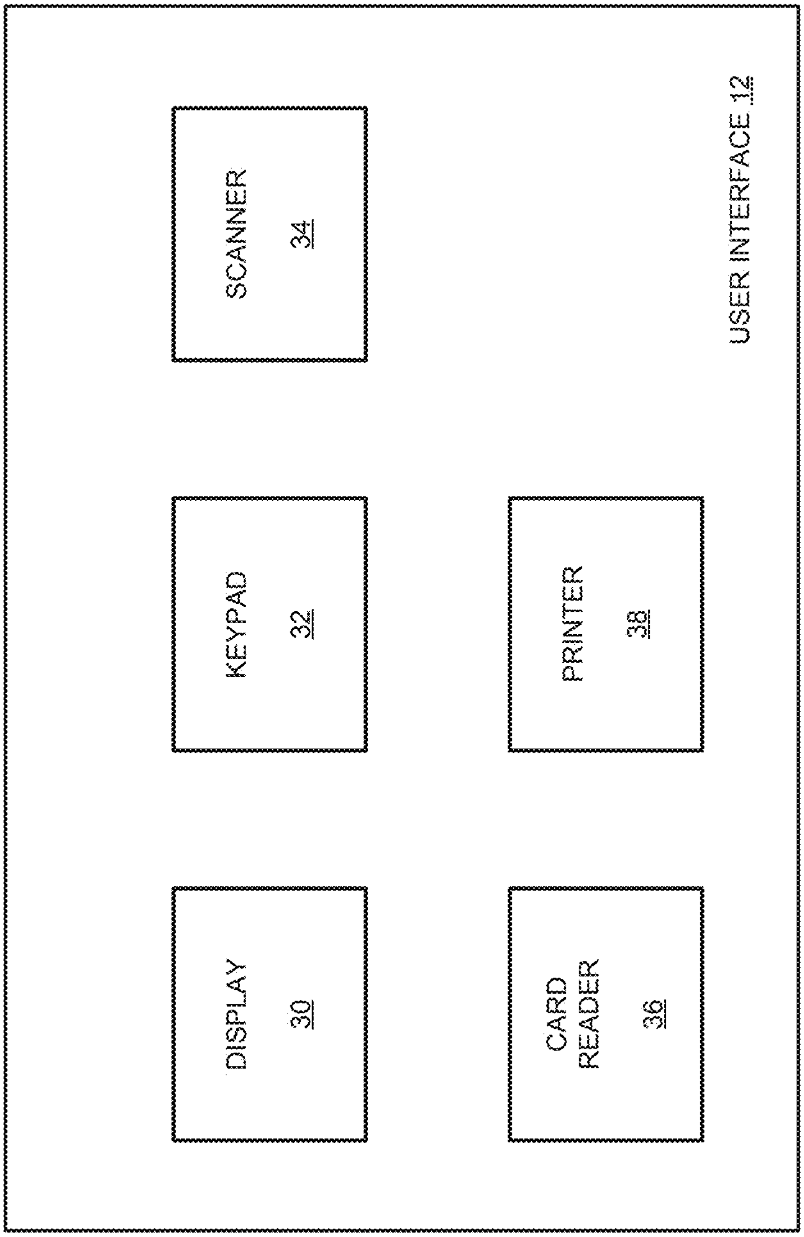
FIG. 2 illustrates a user interface of the robotic servicing system of FIG. 1, in accordance with at least one aspect of the present disclosure.

The user interface 12, as shown in FIG. 2 in accordance with at least one aspect of the present disclosure, includes a display 30, a keypad 32, an optical scanner 34, a card reader 36, and a printer 38. The display 30 provides information, such as for example, the make and model of the vehicle, the type of oil (synthetic or non-synthetic) to be used, the viscosity of the oil to be used, the cost for the oil change service, etc. The keypad 32 allows for the user to provide input data to the robotic servicing system 10 such as, for example, an upgrade to a synthetic oil, a request for a printed receipt, etc. The optical scanner 34 is configured to read a card such as, for example, a membership card or a rewards card associated with the vehicle or the operator of the vehicle. The card reader 36 is configured to read a credit card, a debit card, a gift card and the like in order to secure payment for the oil change service to be provided. The printer 38 is configured to print a receipt and/or other information for the user/operator of the vehicle.

Figure 3:
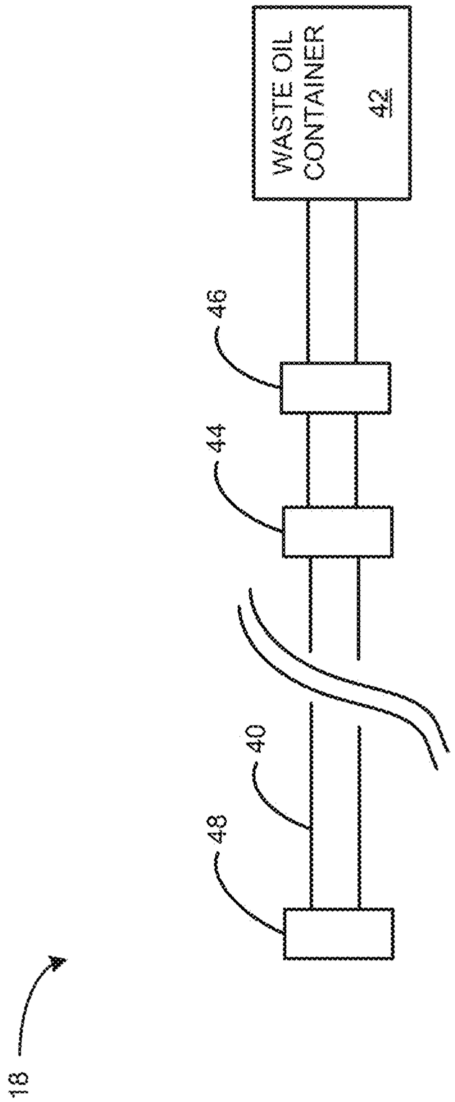
FIG. 3 illustrates an evacuation system of the robotic servicing system of FIG. 1, in accordance with at least one aspect of the present disclosure.

The evacuation system 18, as shown in FIG. 3 in accordance with at least one aspect of the present disclosure, includes hosing 40 which is coupled to a “waste oil” container 42 via a valve 44 and a pump 46. The “waste oil” container 42 is configured to receive the “waste oil” being evacuated from the vehicle and the valve 44 may be utilized to stop the flow of the “waste oil” being evacuated from the vehicle. Although only one “waste oil” container 42, one valve 44 and one pump 46 are shown in FIG. 3, it will be appreciated that the hosing 40 may be coupled to any number of “waste oil” containers 42 via any number of valves 44 and pumps 46. The hosing 40 can be wound on a hose reel (not shown) and has a quick fit connector 48 coupled to an end of the hosing 40. The quick fit connector 48 is configured to mate with the quick fit valve of the vehicle. According to various aspects, a sensor (e.g., one of the sensors 14) of the robotic servicing system 10 is configured to sense whether a connection has been made between the quick fit connector 48 and the quick fit valve of the vehicle.

Figure 4:
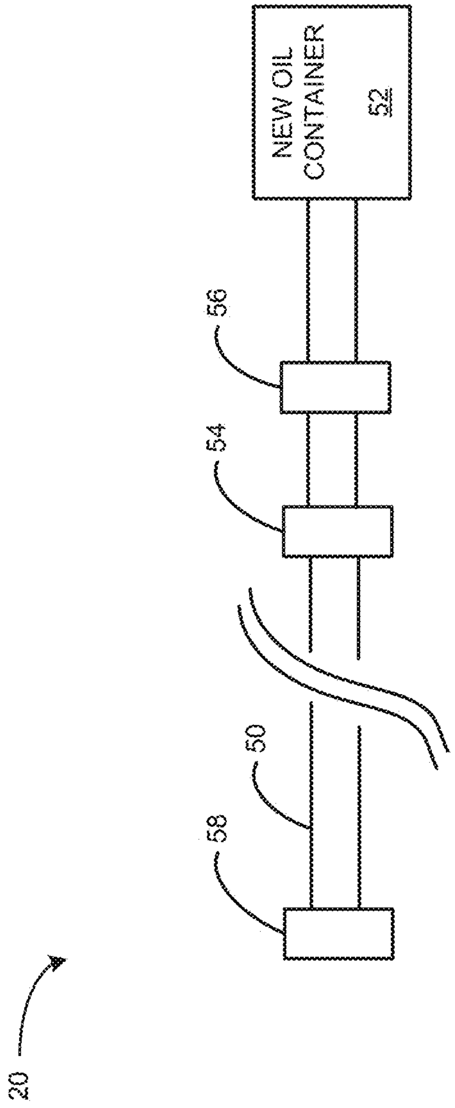
FIG. 4 illustrates a refill system of the robotic servicing system of FIG. 1, in accordance with at least one aspect of the present disclosure.

The refill system 20, as shown in FIG. 4 in accordance with at least one aspect of the present disclosure, includes hosing 50 which is coupled to a “new oil” container 52 via a valve 54 and a pump 56. The “new oil” container 52 contains the “new oil” utilized to refill the motor oil of the vehicle and the valve 44 may be utilized to stop the flow of the “new oil” being provided to the vehicle. Although only one “new oil” container 52, one valve 54 and one pump 56 are shown in FIG. 4, it will be appreciated that the hosing 50 may be coupled to any number of “new oil” containers 52 via any number of valves 54 and pumps 56. The hosing 50 can be wound on a hose reel (not shown) and has a quick fit connector 58 coupled to an end of the hosing 50. The quick fit connector 58 is configured to mate with the quick fit valve of the vehicle. According to various aspects, a sensor (e.g., one of the sensors 14) of the robotic servicing system 10 is configured to sense whether a connection has been made between the quick fit connector 58 and the quick fit valve of the vehicle.

Figure 5:
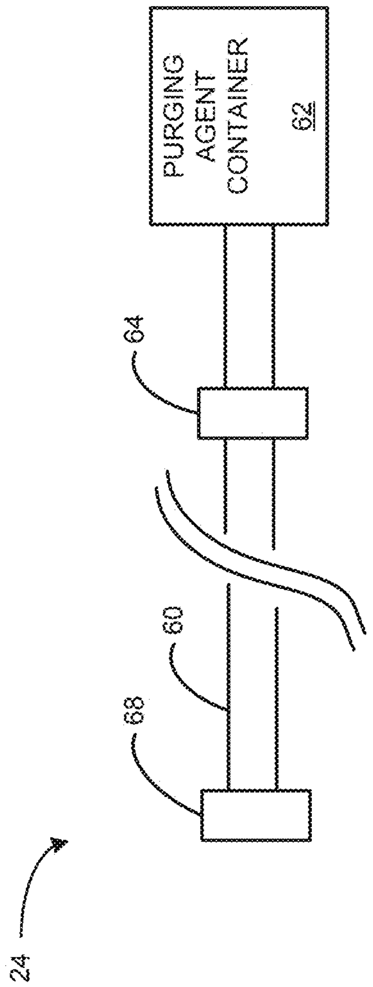
FIG. 5 illustrates a purge system of the robotic servicing system of FIG. 1, in accordance with at least one aspect of the present disclosure.

The purge system 24, as shown in FIG. 5 in accordance with at least one aspect of the present disclosure, includes hosing 60 which is coupled to a purging agent container 62 via a valve 64. The purging agent container 62 contains a pressurized purging agent (e.g., air or nitrogen) and the valve 64 may be utilized to stop the flow of the purging agent provided to the vehicle. The hosing 60 can be wound on a hose reel (not shown) and has a quick fit connector 68 coupled to an end of the hosing 60. The quick fit connector 68 is configured to mate with the quick fit valve of the vehicle. According to various aspects, a sensor (e.g., one of the sensors 14) of the robotic servicing system 10 is configured to sense whether a connection has been made between the quick fit connector 68 and the quick fit valve of the vehicle.

Figure 6:
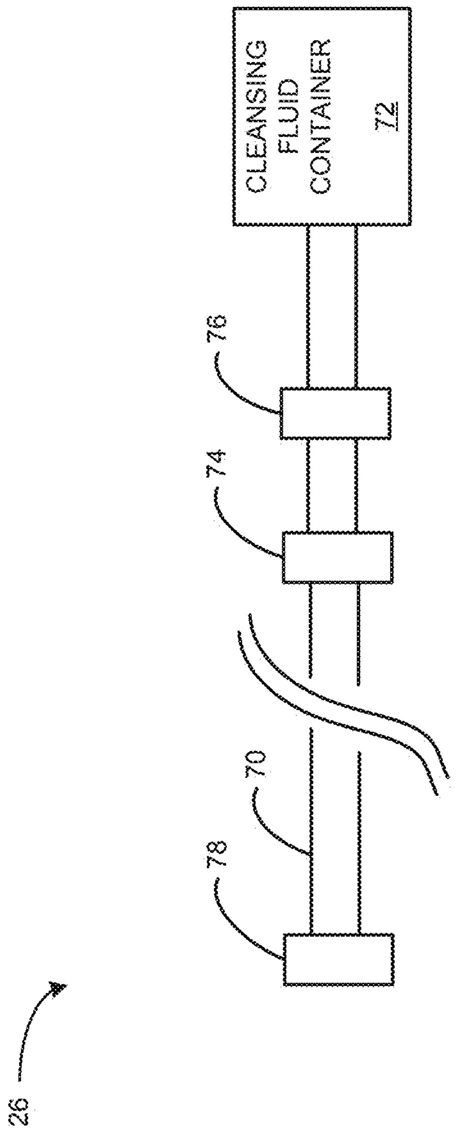
FIG. 6 illustrates a filter cleansing system of the robotic servicing system of FIG. 1, in accordance with at least one aspect of the present disclosure.

The filter cleansing system 26, as shown in FIG. 6 in accordance with at least one aspect of the present disclosure, includes hosing 70 which is coupled to a cleansing fluid container 72 via a valve 74 and a pump 76. The cleansing fluid container 72 contains a cleansing fluid and the valve 74 may be utilized to stop the flow of the cleansing fluid provided to the vehicle. The hosing 70 can be wound on a hose reel (not shown) and has a quick fit connector 78 coupled to an end of the hosing 70. The quick fit connector 78 is configured to mate with the quick fit valve of the vehicle. According to various aspects, a sensor (e.g., one of the sensors 14) of the robotic servicing system 10 is configured to sense whether a connection has been made between the quick fit connector 78 and the quick fit valve of the vehicle.

Figure 7:
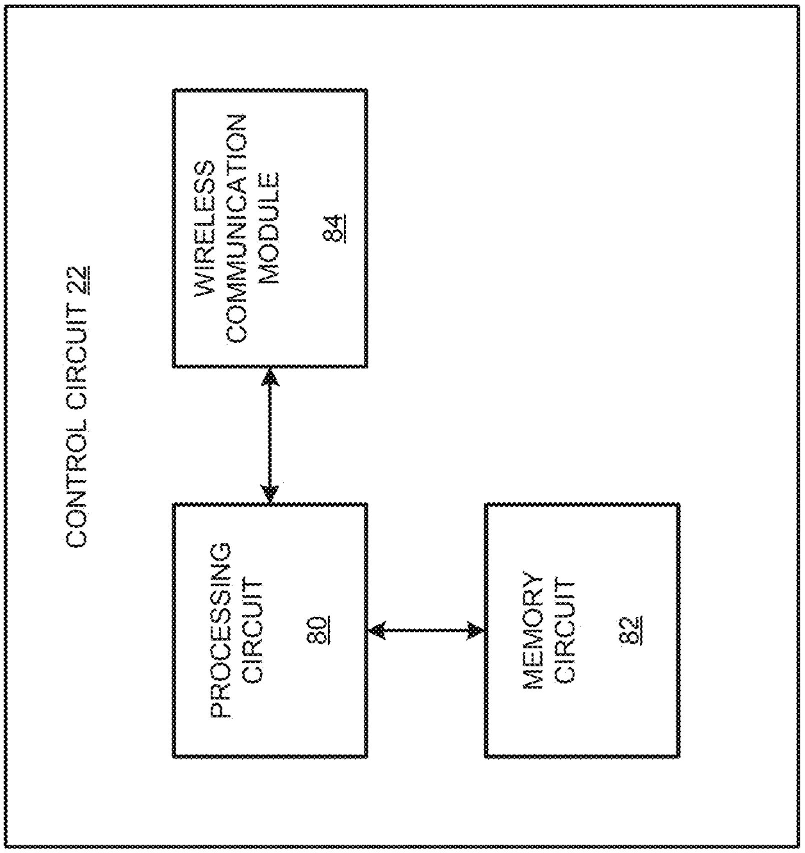
FIG. 7 illustrates a control circuit of the robotic servicing system of FIG. 1, in accordance with at least one aspect of the present disclosure.

The control circuit 22 is coupled to the robotic assembly 11, the user interface 12, the one or more sensors 14, the one or more indicating lights 16, the evacuation system 18, the refill system 20, the purge system 24 and the filter cleansing system 26 (See FIG. 1). As shown in FIG. 7 in accordance with at least one aspect of the present disclosure, the control circuit 22 includes a processing circuit 80, a memory circuit 82 and a wireless communication module 84.

The processing circuit 80 may be, for example, hardwired circuitry, programmable circuitry (e.g., a computer processor including one or more individual instruction processing cores, processing unit, processor, microcontroller, microcontroller unit, controller, digital signal processor (DSP), programmable logic device (PLD), programmable logic array (PLA), or field programmable gate array (FPGA)), state machine circuitry, firmware that stores instructions executed by programmable circuitry, and any combination thereof. The processing circuit 70 may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Accordingly, the processing circuit 80 may include, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

The memory circuit 82 is coupled to the processing circuit 80 and may include more than one type of memory. For example, according to various aspects, the memory 82 circuit may include volatile memory and non-volatile memory. The volatile memory can include random access memory (RAM), which can act as external cache memory. According to various aspects, the random access memory can be static random access memory (SRAM), dynamic random access memory (DRAM), synchronous dynamic random access memory (SDRAM), double data rate synchronous dynamic random access memory (DDR SDRAM), enhanced synchronous dynamic random access memory (ESDRAM), Synchlink dynamic random access memory (SLDRAM), direct Rambus random access memory (DRRAM) and the like. The non-volatile memory can include read-only memory (ROM), programmable read-only memory (PROM), electrically programmable read-only memory, electrically erasable programmable read-only memory (EEPROM), flash memory and the like. According to various aspects, the memory circuit 82 can also include removable/non-removable, volatile/non-volatile storage media, such as for example disk storage. The disk storage can include, but is not limited to, devices like a magnetic disk drive, a floppy disk drive, a tape drive, a Jaz drive, a Zip drive, a LS-60 drive, a flash memory card, or a memory stick. In addition, the disk storage can include storage media separately or in combination with other storage media including, but not limited to, an optical disc drive such as a compact disc ROM device (CD-ROM), a compact disc recordable drive (CD-R Drive), a compact disc rewritable drive (CD-RW Drive), a digital versatile disc ROM drive (DVD-ROM) and the like.

The wireless communication module 84 is configured to enable communication between the robotic servicing system 10 and other devices/systems, including the vehicle, via a network 132 (See FIG. 10), where the communications between the wireless communications module 84 and the network 132 are wireless communications. For example, according to various aspects, as the vehicle approaches the robotic servicing system 10, the vehicle may emit a wireless signal associated with a radio-frequency identification (RFID) tag of the vehicle and the control circuit 22 may be configured to utilize the signal to automatically identify the vehicle based on the signal. For example, based on the received signal, the control circuit 22 may access a database of vehicles enrolled in member service rolls and match information in the signal (e.g., a vehicle ID) with a vehicle in the database. For such vehicles, the database includes information regarding make, model, year and engine of the vehicle, as well as the type, viscosity and volume of oil for the vehicle. Thus, based on the information in the database, the control circuit 22 identifies the make, model, year and engine of the vehicle and determines the type, viscosity and volume of oil associated with the vehicle. Stated differently, the control circuit 22 determines the type, viscosity and volume of "new oil" to be added to the engine of the vehicle during a refill operation.

The wireless communication module 84 can employ any suitable wireless communication technology. For example, according to various aspects, the wireless communication module 84 can employ, Bluetooth, Z-Wave, Thread, ZigBee, and the like. Similarly, the wireless communication module 84 can employ any one of a number of wireless communication standards or protocols, including but not limited to Wi-Fi (IEEE 802.11 family), WiMAX (IEEE 802.16 family), IEEE 802.20, long-term evolution (LTE), and Ev-DO, HSPA+, HSDPA+, HSUPA+, EDGE, GSM, GPRS, CDMA, TDMA, DECT, and Ethernet derivatives thereof, as well as any other wireless protocols that are designated as 3G, 4G, 5G, and beyond.

Figure 8:
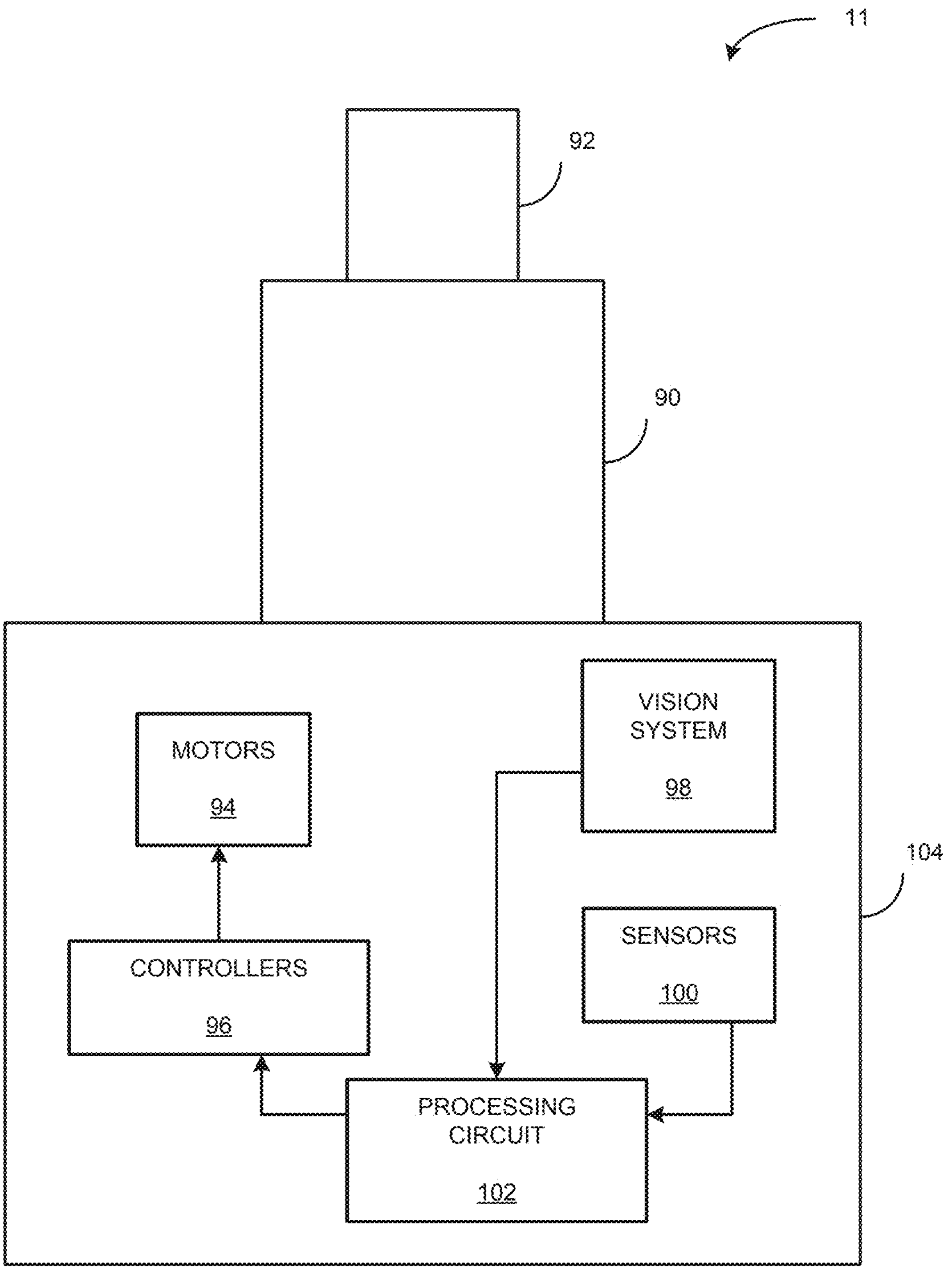
FIG. 8 illustrates a robotic assembly of the robotic servicing system, in accordance with at least one other aspect of the present disclosure.

The robotic assembly 11, as shown in FIG. 8 in accordance with at least one aspect of the present disclosure, includes a robotic arm 90 configured to hold a variety of different interchangeable tools 92 which are suitable for various aspects of an oil change service. According to various aspects, such tools 92 include, for example, a grasping tool configured to grasp any of the above-described quick fit connectors 48, 58, 68, 78 (or any of the hosing 40, 50, 60, 70), a socket type tool configured to engage with the drain plug of the vehicle, a filter wrench type tool configured to engage with an oil filter of the vehicle, etc. Although the robotic assembly 11 is described herein in the context of including one robotic arm 90 for purposes of simplicity, it will be appreciated that the robotic assembly 11 may include any number of robotic arms (e.g., two arms, three arms, etc.)

The robotic assembly 11 also includes a plurality of motors 94, one or more controllers 96, a vision system 98, a plurality of sensors 100 and a processing circuit 102. As represented in FIG. 8, at least a portion of the one or more controllers 96, the vision system 98, the plurality of sensors 100 and the processing circuit 102 may be positioned within a housing 104. The motors 94 operate to move the robotic arm 90 and the tool 92 to desired positions and orientations relative to the vehicle with at least six degrees of freedom (i.e., translation in three perpendicular axes (forward/backward, up/down and left/right) combined with rotation about three perpendicular axes (pitch, yaw, and roll). The motors 94 may be any suitable type of motors (e.g., linear motors, servo motors, stepper motors, combinations thereof, etc.) and also operate to actuate the various tools 92 to grasp, open and close, rotate, extend, etc.

The one or more controllers 96 are configured to control the operation of the motors 94 based on control signals (e.g., drive signals) output by the processing circuit 102. The vision system 98 is configured to assess the position of the robotic arm 90 and the tool 92 relative to the vehicle (or the target point of the vehicle such as, for example, a quick connect valve at an exterior of the vehicle, the drain plug of the vehicle, the oil filter of the vehicle, etc.) and provide this information as feedback to the processing circuit 102 so the processing circuit 102 can in turn determine the proper control signals to be output to the one or more controllers 94 to properly position the robotic arm 90 and the tool 92. According to various aspects, the vision system 98 is also configured to assess the position of the robotic arm 90 and the tool 92 relative to any of the above-described quick fit connectors 48, 58, 68, 78 (or any of the hosing 40, 50, 60, 70) and provide this information as feedback to the processing circuit 102 so the processing circuit 102 can in turn determine the proper control signals to be output to the one or more controllers 94 to properly position the robotic arm 90 and the tool 92. According to yet other aspects, the vision system 98 is configured to assess the position of the robotic arm 90 relative to any of the "unconnected" tools 92 and provide this information as feedback to the processing circuit 102 so the processing circuit 102 can in turn determine the proper control signals to be output to the one or more controllers 94 to properly position the robotic arm 90 relative to the "unconnected" tools 92 to autonomously connect the desired tool 92 to the robotic arm 90. The vision system 98 may be implemented in any suitable manner. For example, according to various aspects, the vision system 98 includes one or more cameras or other imaging devices. According to other aspects, the vision system 98 is implemented by a laser vision system. According to yet other aspects, the vision system is implemented by a machine vision system.

The plurality of sensors 100 may be similar or identical to the sensors 14 described hereinabove. According to various aspects, one or more of the sensors 100 are configured to sense whether the robotic arm 90 has engaged with one of the tools 92, or whether a tool 92 engaged with the robotic arm 90 has engaged with any of the above-described quick fit connectors 48, 58, 68, 78 (or any of the hosing 40, 50, 60, 70). Similarly, one or more of the sensors 100 may be configured to sense whether any of the tools 92 have engaged with the drain plug of the vehicle, with the oil filter of the vehicle, etc. According to yet other aspects, one or more of the sensors 100 are configured to sense whether any of the above-described quick fit connectors 48, 58, 68, 78 have mated with the quick fit valve of the vehicle. One or more of the sensors 100 may also be utilized to sense the position of vehicle, the position of the robotic arm 90 and the tool 92 relative to the vehicle, the position of the robotic arm 90 relative to an "unconnected" tool 92, and the like. The processing circuit 102 may be similar or identical to the processing circuit 80 described hereinabove.

Figure 9:
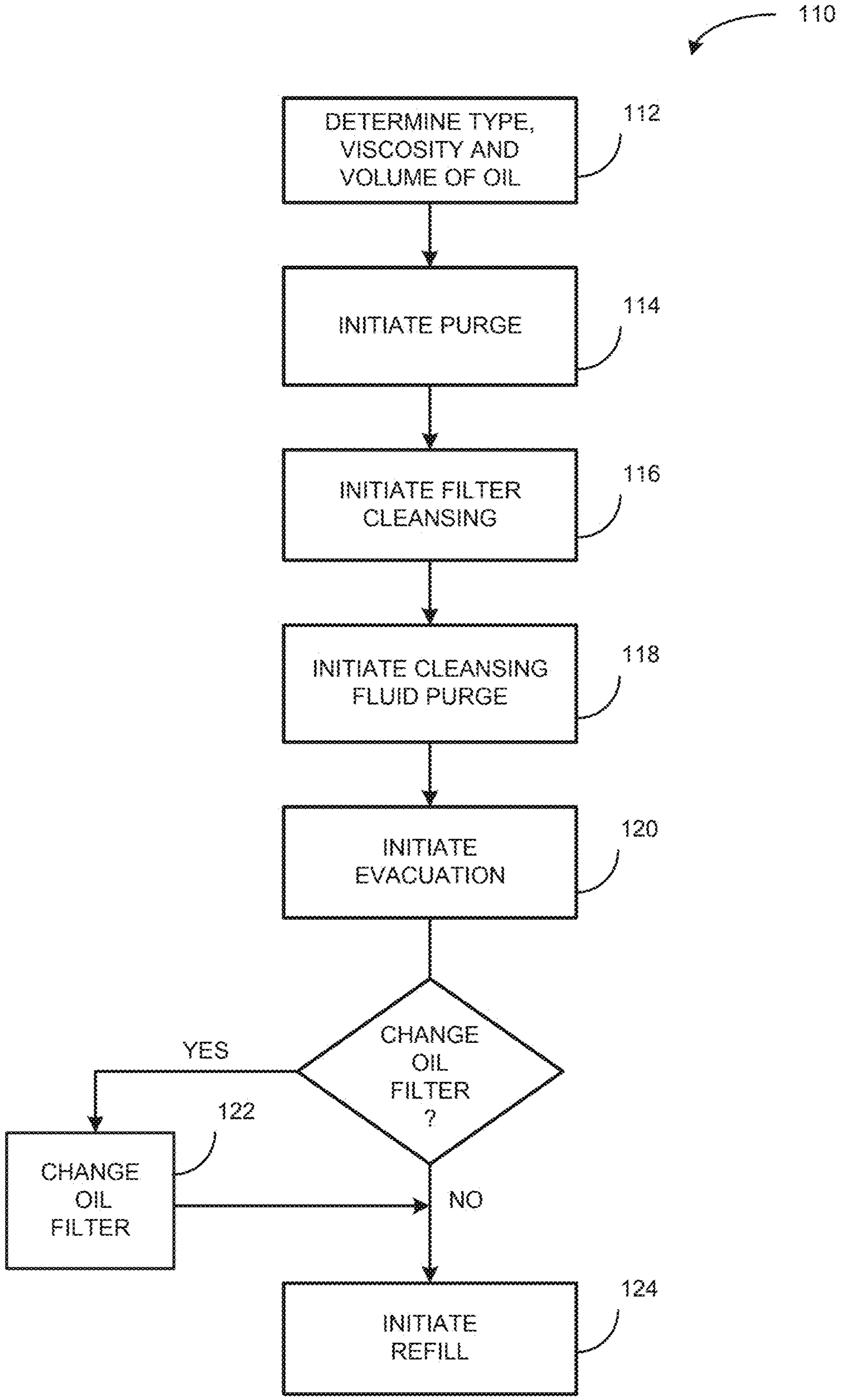
FIG. 9 illustrates a method of performing a robotically controlled oil change service in accordance with at least one aspect of the present disclosure.

FIG. 9 illustrates a method 110 of performing a robotically controlled oil change service in accordance with at least one aspect of the present disclosure. The method 110 may be implemented by the robotic servicing system 10. In operation, as a vehicle approaches the robotic servicing system 10, the control circuit 22 or the robotic assembly 11 (e.g., the vision system 98, the sensors 100 or the processing circuit 102) recognizes whether the vehicle has a service ID associated with vehicles enrolled in member service rolls. The recognition may be a result of a signal communicated from the vehicle (e.g., a signal associated with a radio-frequency identification (RFID) tag) or an image of the vehicle (or an image of a license plate, a bar code, or the like on the vehicle) captured by the vision system 98. For such instances, the control circuit 22 or the robotic assembly 11 identifies the vehicle make, model, year and engine and determines 112 the type, viscosity and volume of oil for the vehicle. The control circuit 22 or the robotic assembly 11 also prompts the driver of the vehicle to drive the vehicle onto the designated service pad, utilizes one or more of the one or more sensors 14 (or the vision system 98 or one or more of the sensors 100) to determine the position of the vehicle relative to the designated service pad and controls the operation of the one or more lights 16 to light up when the vehicle is properly positioned on the designated service pad.

Figure 10:
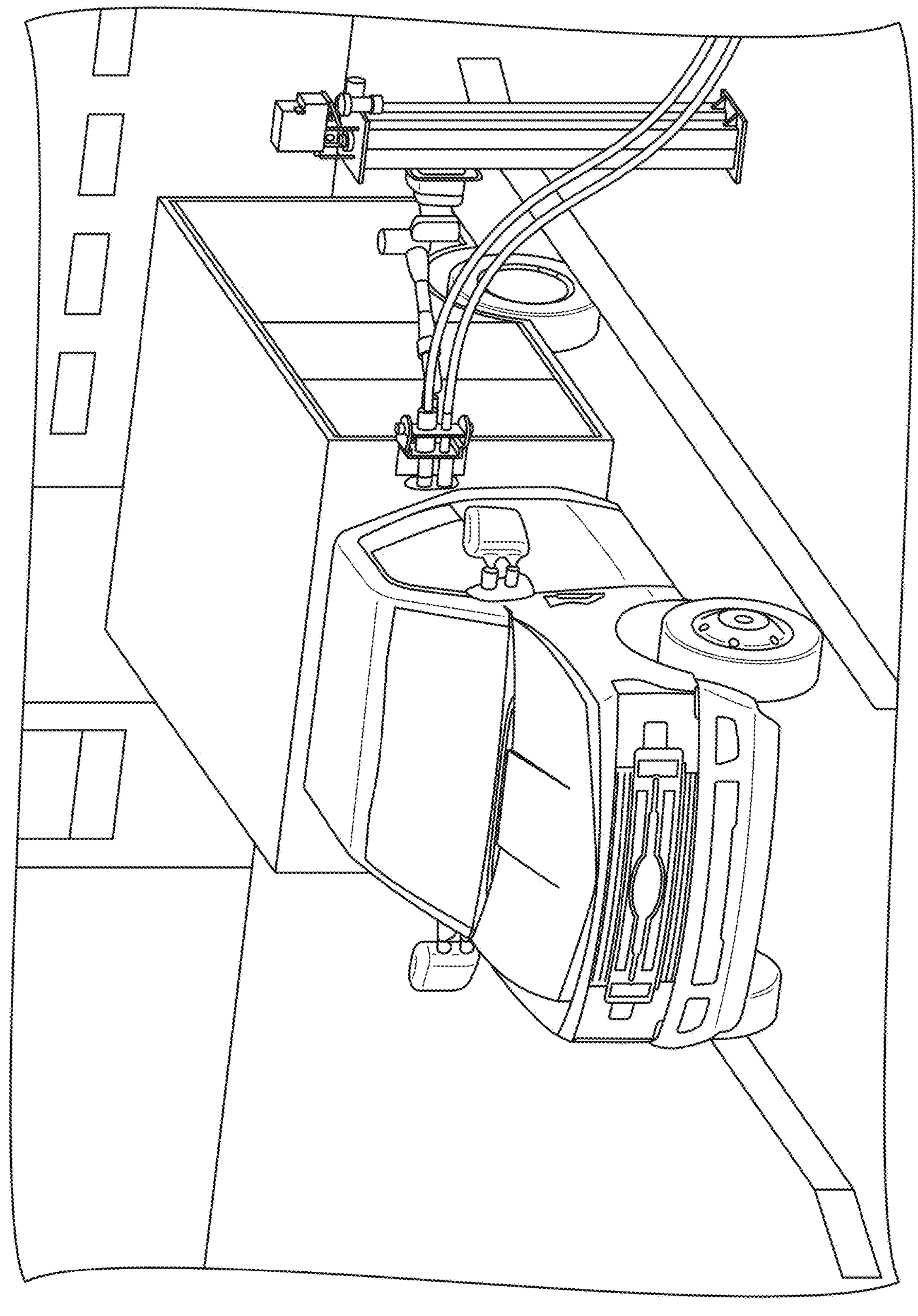
FIG. 10 illustrates an example of a robotic assembly 11 of the robotic servicing system of FIG. 1 connecting a quick fit connector of the robotic servicing system to a quick fit valve of a vehicle, in accordance with at least one aspect of the present disclosure.

Once the vehicle is properly positioned on the designated service pad, the robotic assembly 11 is controlled to initiate 114 the purge aspect of the oil change service by autonomously attaching the quick fit connector 68 coupled to an end of the hosing 60 of the purge system 24 to the quick fit valve of the vehicle. An example of the robotic assembly 11 connecting a quick fit connector to the quick fit valve of a vehicle is shown in FIG. 10, in accordance with at least one aspect of the present disclosure. According to various aspects, a sensor (e.g., one of the sensors 14 or one of the sensors 100) is configured to sense that the connection between the quick fit connector 68 and the quick fit valve of the vehicle has been made, generate a signal indicative of the connection having been made, and communicate the signal to the control circuit 22 or the processing circuit 102. Upon receipt of the signal, the control circuit 22 or the processing circuit 102 operates to allow the purge aspect of the oil change service to begin. According to various aspects, without the signal, the control circuit 22 or the processing circuit 102 operates as if the connection has not been made and prevents the purge aspect of the oil change service from beginning. In other words, the control circuit 22 or the processing circuit 102 locks out the purge aspect of the oil change service until the signal is communicated from the sensor.

For the purge aspect of the oil change service, the robotic servicing system 10 introduces the pressurized purging agent from the purging agent container 62 to the quick fit valve of the vehicle, and the pressurized purging agent operates to purge oil from the existing oil filter (or filters) into the engine sump. The pressurized purging agent acts to dislodge and remove any trapped particulate or oil from the oil filter (or oil filters) of the vehicle, thereby allowing for the dislodged particulate or oil to be subsequently removed from the engine sump during an evacuation aspect of the oil change service. Although the oil filter purge can operate for any reasonable amount of time, the purge aspect of the oil change service is typically completed within approximately 10-20 seconds.

According to various aspects, following completion of the purge aspect of the oil change service, for aspects of the robotic servicing system 10 which include the filter cleansing system 26, the robotic assembly 11 is controlled to initiate 116 the filter cleansing aspect of the oil change service by autonomously attaching the quick fit connector 78 coupled to an end of the hosing 70 of the filter cleansing system 26 to the quick fit valve of the vehicle. According to various aspects, a sensor (e.g., one of the sensors 14 or one of the sensors 100) is configured to sense that the connection between the quick fit connector 78 and the quick fit valve of the vehicle has been made, generate a signal indicative of the connection having been made, and communicate the signal to the control circuit 22 or the processing circuit 102. Upon receipt of the signal, the control circuit 22 or the processing circuit 102 operates to allow the filter cleansing aspect of the oil change service to begin. According to various aspects, without the signal, the control circuit 22 or the processing circuit 102 operates as if the connection has not been made and prevents the filter cleansing aspect of the oil change service from beginning. In other words, the control circuit 22 or the processing circuit 102 locks out the filter cleansing aspect of the oil change service until the signal is communicated from the sensor.

For the filter cleansing aspect of the oil change service, the robotic servicing system 10 is controlled to introduce the cleansing fluid from the filter cleaning container 72 to the quick fit valve of the vehicle, which is coupled to the reusable oil filter of the vehicle. An example of a reusable filter can be found, for example, in U.S. Patent Application Publication No. 20190282935, the entire content of which is hereby incorporated by reference. The cleansing fluid is introduced to the reusable filter in reverse flow—from a clean side of the filter to an unfiltered side. The cleansing fluid acts to back flush contaminants from the 'unfiltered' side of filter media. The control circuit 22 or the processing circuit 102 is configured to monitor the cleansing fluid used for the filter cleansing, and determine when contaminants in the cleansing fluid have reached a desired level. Once the desired level has been reached, the control circuit 22 or the processing circuit 102 may operate to stop the filter cleansing aspect of the oil change service.

Following completion of the filter cleansing aspect of the oil change service, according to various aspects, the robotic servicing system 10 may be controlled to initiate 118 the cleansing fluid purge aspect of the oil change service by autonomously attaching the quick fit connector 68 of the purge system 24 to the quick fit valve of the vehicle. Once the control circuit 22 or the processing circuit 102 establishes that a connection has been made between the quick fit connector 68 and the quick fit valve of the vehicle, the control circuit 22 or the processing circuit 102 allows the introduction of a pressurized fluid (e.g., air or nitrogen) into the quick fit valve of the vehicle to purge cleansing fluid from the filter which has just been cleaned. On removal of all the cleansing fluid from filter, the control circuit 22 or the processing circuit 102 may stop the cleansing fluid purge aspect of the oil change service. Although the purge system 24 and the filter cleansing system 26 have been described as two separate systems, it will be appreciated that according to other aspects, various components such as the hosing 60, 70 and the quick fit connectors 68. 78 may be combined to form a single hosing and a single quick fit connector. The purge and/or filter cleansing aspects of the oil change service generally returns the reusable filter (or filters) to a like-new condition. In cases where the purge and/or filter cleansing aspects of the oil change service do not adequately clean the reusable filter, the robotic service system 10 may be controlled to replace the "old" reusable filter with a new reusable filter as described below.

For aspects of the robotic servicing system 10 which do not include the purge system 24 and the filter cleansing system 26, or following completion of the purge and/or filter cleansing aspects of the oil change service, the robotic servicing system 10 may be controlled to initiate 120 the evacuation aspect of the oil change service by autonomously attaching the quick fit connector 48 coupled to an end of the hosing 40 of the evacuation system 18 to the quick fit valve of the vehicle. According to various aspects, a sensor (e.g., one of the sensors 14 or one of the sensors 100) is configured to sense that the connection between the quick fit connector 48 and the quick fit valve of the vehicle has been made, generate a signal indicative of the connection having been made, and communicate the signal to the control circuit 22 or the processing circuit 102. Upon receipt of the signal, the control circuit 22 or the processing circuit 102 operates to allow the evacuation aspect of the oil change service to begin. According to various aspects, without the signal, the control circuit 22 or the processing circuit 102 operates as if the connection has not been made and prevents the evacuation aspect of the oil change service from beginning. In other words, the control circuit 22 or the processing circuit 102 locks out the evacuation aspect of the oil change service until the signal is communicated from the sensor.

For the evacuation aspect of the oil change service, the robotic servicing system 10 "pulls" the oil from the engine sump to the quick fit valve of the vehicle, through the quick fit connector 48 and the hosing 40 of the evacuation system 18 and back to the "waste oil" container 42. The pressurized pulling (i.e., negative pressure) of the oil from the engine sump results in a more thorough and complete evacuation of the engine oil than is the case with traditional gravity draining.

Following completion of the evacuation aspect of the oil change service, the robotic servicing system 10 can then be controlled to change 122 the oil filter (or oil filters) of the vehicle or initiate 124 the refill aspect of the oil change service. The robotic servicing system 10 may be controlled to change a conventional oil filter (as would almost always be the case) or a reusable oil filter if the reusable filter was not adequately cleaned by the purge aspect, the filter cleansing aspect and the cleansing fluid purge aspect of the oil change service. The robotic servicing system 10 may be controlled to initiate 124 the refill aspect of the oil change service by autonomously attaching the quick fit connector 58 coupled to an end of the hosing 50 of the refill system 20 to the quick fit valve of the vehicle. According to various aspects, a sensor (e.g., one of the sensors 14 or one of the sensors 100) is configured to sense that the connection between the quick fit connector 58 and the quick fit valve of the vehicle has been made, generate a signal indicative of the connection having been made, and communicate the signal to the control circuit 22 or the processing circuit 102. Upon receipt of the signal, the control circuit 22 or the processing circuit 102 operates to allow the refill aspect of the oil change service to begin. According to various aspects, without the signal, the control circuit 22 or the processing circuit 102 operates as if the connection has not been made and prevents the refill aspect of the oil change service from beginning. In other words, the control circuit 22 or the processing circuit 102 locks out the refill aspect of the oil change service until the signal is communicated from the sensor.

For the refill aspect of the oil change service, the robotic servicing system 10 "pushes" new clean motor oil from the "new oil" container 52 into the quick fit valve of the vehicle, where the new clean oil is then distributed to the engine of the vehicle via the oil filter (or oil filters). Based on the information regarding the vehicle model, make, year and engine, the control circuit 22 or the processing circuit 102 controls the delivery of the correct type, viscosity and volume of "new oil" to the engine of the vehicle.

According to various aspects, once a predetermined volume of oil has been delivered to the engine of the vehicle, the robotic servicing system 10 can then prompt a person associated with the vehicle to "verify" the level of the oil in the engine by checking a dipstick of the engine. The person can then instruct the robotic servicing system 10 to add or evacuate oil as necessary in order to achieve a desired oil level in the engine of the vehicle, or the person may opt to do this manually.

The robotic servicing system 10 is further configured to signal to a person associated with the vehicle that the oil change service has been completed, and to record the event for automatic billing to a Customer account.

Figure 11:
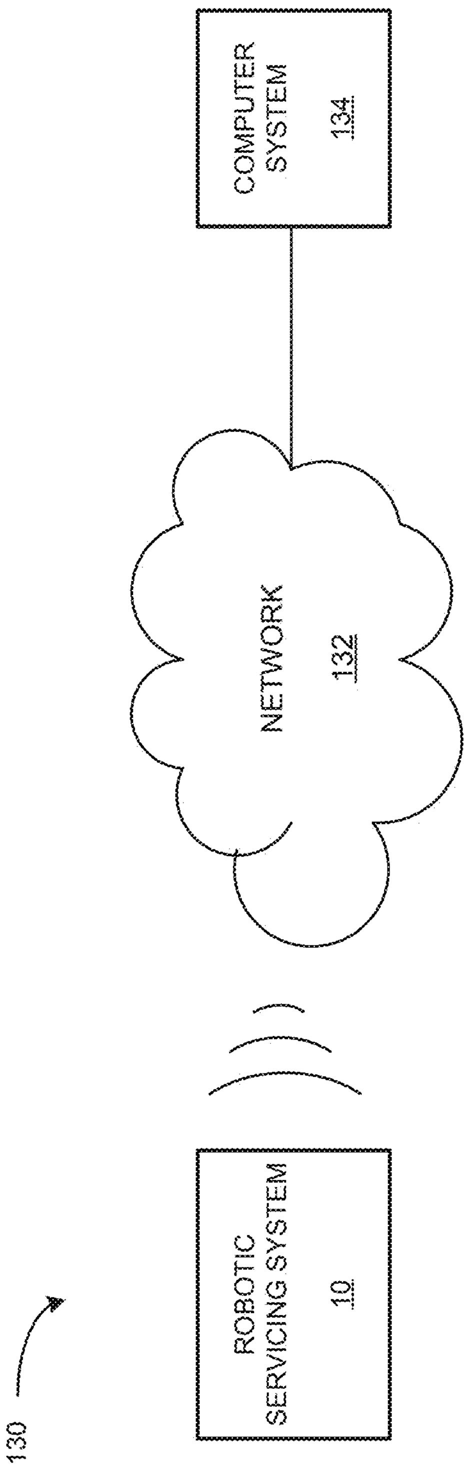
FIG. 11 illustrates a management system in accordance with at least one aspect of the present disclosure.

FIG. 11 illustrates a management system 130, in accordance with at least one aspect of the present disclosure. The management system 130 includes the robotic servicing system 10, a network 132 and one or more computing systems 134. The robotic servicing system 10 is communicably connected with the one or more computing systems 134 via the network 132. The network 132 may include any type of delivery system including, but not limited to, a local area network (e.g., Ethernet), a wide area network (e.g. the Internet and/or World Wide Web), a telephone network (e.g., analog, digital, wired, wireless, PSTN, ISDN, GSM, GPRS, and/or xDSL), a packet-switched network, a radio network, a television network, a cable network, a satellite network, and/or any other wired or wireless communications network configured to carry data. The network 132 may include elements, such as, for example, intermediate nodes, proxy servers, routers, switches, and adapters configured to direct and/or deliver data. In general, the robotic servicing system 10 is configured to communicate with the one or more computing systems 134 via the network 132 using various communication protocols (e.g., HTTP, TCP/IP, UDP, WAP, WiFi, Bluetooth) and/or to operate within or in concert with one or more other communications systems. As the robotic servicing system 10 can connect to the Internet, it will be appreciated that the robotic servicing system 10 can have a distinct Internet Protocol address (IP address) which allows for host or network interface identification and location addressing.

The one or more computing systems 134 can include, for example, a computing system of an owner of the robotic servicing system 10, a computing system of a service provider associated with the robotic servicing system 10, a computing system associated with an owner of the vehicle being serviced by the robotic servicing system 10, etc., and each of these computing systems can be at locations which are remote from the vehicle being serviced.

According to various aspects, at least one of the one or more computing systems 134 can function as an inventory management system. For example, as the robotic servicing system 10 knows the amount of new clean oil provided from the "new oil" container 52, the computing system 134 knows the inventory of the new clean oil in the "new oil" container 52 in real-time or in near-real time.

EXAMPLES

Example 1—A robotic serving system is provided. The robotic servicing system comprises an evacuation system, a refill system and a robotic assembly. The evacuation system comprises a first quick connect fitting configured to mate with a quick connect valve of a vehicle. The refill system comprises a second quick connect fitting configure to mate with the quick connect valve of the vehicle. The robotic assembly is couplable to the evacuation system and the refill system, and is configured to autonomously connect the first and second quick connection fittings to the quick connect valve of the vehicle.

Example 2—The robotic serving system of Example 1, wherein the evacuation system further comprises at least one of the following (1) a hose coupled to the first quick connect fitting, (2) a valve coupled to the first quick connect fitting and (3) a pump coupled to the first quick connect fitting.

Example 3—The robotic serving system of Examples 1 or 2, wherein the refill system further comprises at least one of the following (1) a hose coupled to the second quick connect fitting, (2) a valve coupled to the second quick connect fitting and (3) a pump coupled to the second quick connect fitting.

Example 4—The robotic serving system of Examples 1, 2 or 3, wherein the robotic assembly comprises at least one robotic arm configured to hold a tool.

Example 5—The robotic serving system of Example 4, wherein the robotic assembly further comprises the tool.

Example 6—The robotic serving system of Examples 4 or 5, wherein the robotic assembly further comprises at least one motor coupled to the at least one robotic arm and at least one controller coupled to the at least one motor.

Example 7—The robotic serving system of Examples 4, 5 or 6, wherein the robotic assembly further comprises a vision system.

Example 8—The robotic serving system of Examples 4, 5, 6 or 7, wherein the robotic assembly further comprises one or more sensors.

Example 9—The robotic serving system of Example 8, wherein a first one of the one or more sensors is configured to sense whether the first quick connect fitting is connected to the quick connect valve of the vehicle.

Example 10—The robotic serving system of Example 9, wherein a second one of the one or more sensors is configured to sense whether the second quick connect fitting is connected to the quick connect valve of the vehicle.

Example 11—The robotic serving system of Examples 1, 2, 3, 4, 5, 6, 7, 8, 9 or 10, wherein the robotic assembly is further configured to identify the vehicle based on at least one of the following (1) a signal received from the vehicle and (2) an image associated with the vehicle.

Example 12—The robotic serving system of Example 11, wherein the robotic assembly is further configured to determine a type, a viscosity and a volume of motor oil associated with the vehicle.

Example 13—The robotic serving system of Examples 11 or 12, wherein the robotic assembly is further configured to control a volume of new oil added to the vehicle.

Example 14—The robotic serving system of Examples 1, 2, 3, 4, 5, 6, 7, 8, 9, 10, 11, 12 or 13, further comprising a purge system couplable to the robotic assembly.

Example 15—The robotic serving system of Example 14, further comprising a filter cleansing system couplable to the robotic assembly.

Example 16—A method of performing a robotically controlled oil change service is provided. The method comprises utilizing a robotic assembly to couple an evacuation system to a quick connect valve of a vehicle to evacuate oil from an engine of the vehicle, utilizing the robotic assembly to couple a refill system to the quick connect valve of the vehicle, and controlling a volume of new oil added to the vehicle via the refill system.

Example 17—The method of Example 16, further comprising automatically identifying the vehicle based on at least one of the following (1) a signal communicated from the vehicle and (2) an image associated with the vehicle.

Example 18—The method of Example 17, further comprising determining a type, a viscosity and a volume of the new oil based on the identified vehicle.

Example 19—The method of Examples 16, 17 or 18, further comprising introducing a purging agent to an oil filter of the vehicle.

Example 20—The method of Example 19, further comprising introducing a cleansing fluid to the oil filter of the vehicle.

Although the various aspects of the robotic servicing system have been described herein in connection with certain disclosed aspects, many modifications and variations to those aspects may be implemented. Also, where materials are disclosed for certain components, other materials may be used. Furthermore, according to various aspects, a single component may be replaced by multiple components, and multiple components may be replaced by a single component, to perform a given function or functions. The foregoing description and the appended claims are intended to cover all such modifications and variations as falling within the scope of the disclosed aspects.

While this invention has been described as having exemplary designs, the described invention may be further modified within the spirit and scope of the disclosure. This application is therefore intended to cover any variations, uses, or adaptations of the invention using its general principles. For example, although the invention was described in the context of a robotic servicing system configured to perform an oil change service for a vehicle, the general principles of the invention are equally applicable to the robotic servicing system performing other services for vehicles or other types of machines. For example, the robotic servicing system 10 may also be configured to perform transmission fluid change services, hydraulic fluid change services, steering fluid change services, etc. Similarly, in addition to performing certain services for vehicles, the robotic servicing system 10 may also be configure to provide analogous services for other types of machines such as, for example, earth moving machines (e.g., an excavator, a high-lift, a bulldozer, etc.), machines other than earth moving machines, mobile generators, etc.

Any patent, patent application, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

What is claimed is:

1. A system configured to perform a service on a vehicle, the system comprising: a vision system configured to assess the vehicle and generate a signal associated with the assessment of the vehicle; and a control circuit communicably couplable to the vision system and a robotic arm, wherein the control circuit is configured to:

receive the signal from the vision system;

determine information associated with the vehicle based on the received signal; and generate a control signal based on the information associated with the vehicle, wherein the control signal is configured to cause a robotic arm to autonomously perform a filter cleansing operation customized for the vehicle based on the information associated with the vehicle.

2. The system of claim 1, wherein the service further comprises at least one of a fluid purge operation, a fluid evacuation operation, or a filter replacement operation, or combinations thereof.

3. The system of claim 1, wherein the control circuit is further configured to: monitor the filter cleansing operation;

determine when contaminants in a cleansing fluid have reached a desired level; and stop the filter cleansing operation.

4. The system of claim 1, wherein the control circuit is further configured to: generate a second control signal based on the information associated with the vehicle, wherein the second control signal is configured to cause the robotic arm to autonomously initiate an action associated with the vehicle service.

5. The system of claim 4, wherein the action comprises attaching a fitting of a refill system to a valve of the vehicle.

6. The system of claim 1, wherein the information associated with the vehicle comprises at least one of a fluid type, a fluid viscosity, or a fluid volume, or combinations thereof.

7. The system of claim 1, wherein the information associated with the vehicle comprises at least one of a vehicle make, a vehicle model, a vehicle year, or an engine type, or combinations thereof.

8. The system of claim 1, further comprising a sensor communicably couplable to the control circuit, wherein the sensor is configured to detect a condition of the vehicle.

9. A system configured to perform a service on a vehicle, the system comprising: a vision system configured to assess the vehicle and generate a signal associated with the assessment of the vehicle; and a control circuit communicably couplable to the vision system, wherein the control circuit is configured to:

receive the signal from the vision system;

determine information associated with the vehicle based on the received signal; and generate a control signal based on the information associated with the vehicle, wherein the control signal is configured to cause a robotic arm to autonomously perform a vehicle service customized for the vehicle based on the information associated with the vehicle.

10. The system of claim 9, wherein the vehicle service comprises a filter cleansing operation.

11. The system of claim 9, wherein the control circuit is further configured to: monitor the vehicle service; and stop the vehicle service.

12. A system configured to perform a service on a vehicle, the system comprising: a vision system configured to assess the vehicle and generate signals associated with assessments of the vehicle; and a control circuit communicably couplable to the vision system and a robotic arm, wherein the control circuit is configured to:

receive a signal from the vision system; and generate a control signal configured to cause a robotic arm to autonomously perform a vehicle service on the vehicle based on the signal received from the vision system, wherein the vehicle service comprises a filter cleansing operation.

13. The system of claim 12, wherein the vehicle service further comprises at least one of refueling the vehicle, checking a tire pressure of the vehicle, altering the tire pressure of the vehicle, checking a brake of the vehicle, greasing the vehicle, checking a fluid of the vehicle, or adding the fluid to the vehicle, or combinations thereof.

14. The system of claim 12, wherein the control circuit is further configured to: generate a second control signal based on the information associated with the vehicle, wherein the second control signal is configured to cause the robotic arm to autonomously initiate an action associated with the vehicle service.

15. The system of claim 14, wherein the action comprises attaching a fitting of a fluid service system to a valve of the vehicle.

16. The system of claim 12, wherein the control circuit is further configured to: monitor the filter cleansing operation;

determine when contaminants in a cleansing fluid have reached a desired level; and stop the filter cleansing operation.

17. The system of claim 12, further comprising a sensor communicably couplable to the control circuit, wherein the sensor is configured to detect a condition of the vehicle.

18. The system of claim 12, wherein the vehicle service further comprises at least one of a fluid purge operation, a fluid evacuation operation, or a filter replacement operation, or combinations thereof.

19. The system of claim 12, wherein the signal comprises information associated with the vehicle, and wherein the information associated with the vehicle comprises at least one of a vehicle make, a vehicle model, a vehicle year, or an engine type, or combinations thereof.

20. The system of claim 12, wherein the control circuit is configured to generate the control signal based on a fluid type, a fluid viscosity, or a fluid volume, or combinations thereof.

* * * * *